(12) United States Patent
Bender et al.

(10) Patent No.: US 10,755,310 B2
(45) Date of Patent: Aug. 25, 2020

(54) SYSTEM AND METHOD FOR DYNAMIC ADVERTISING

(71) Applicant: INTERNATIONAL BUSINESS MACHINES CORPORATION, Armonk, NY (US)

(72) Inventors: Michael Bender, Rye Brook, NY (US); Rhonda L. Childress, Austin, TX (US); Timothy J. Forshee-Lee, Lexington, KY (US); Mary E. Rudden, Denver, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 498 days.

(21) Appl. No.: 15/175,535

(22) Filed: Jun. 7, 2016

(65) Prior Publication Data
US 2017/0352058 A1   Dec. 7, 2017

(51) Int. Cl.
*G06Q 30/00* (2012.01)
*G06Q 30/02* (2012.01)
(Continued)

(52) U.S. Cl.
CPC ..... *G06Q 30/0261* (2013.01); *G06Q 30/0272* (2013.01); *G06Q 30/0621* (2013.01); *G06Q 50/01* (2013.01)

(58) Field of Classification Search
CPC . G06Q 30/0277; G06Q 30/0269; G06Q 30/02
See application file for complete search history.

(56) References Cited

U.S. PATENT DOCUMENTS 8,107,940 B1 *  1/2012  Jackson ............. G06Q 30/0241
                                                 379/114.1
8,626,586 B1     1/2014  Biere et al.
(Continued)

FOREIGN PATENT DOCUMENTS

JP    2005127651       5/2005
WO    2005/091258      9/2005
(Continued)

OTHER PUBLICATIONS

Schmidt; Interacting with 21st Century Computers; 2012; IEEE CS; pp. 22-31; 2012.*
(Continued)

*Primary Examiner* — Radu Andrei
(74) *Attorney, Agent, or Firm* — Brian Restauro; Andrew D. Wright; Roberts, Calderon, Safran & Cole, P.C.

(57) ABSTRACT

Systems and methods for displaying an image on an image-enabled clothing article are disclosed. A method that can be used with the systems include determining, by a computing device, that at least a first advertisement and a second advertisement are acceptable for a participant. The computing device sends an option to select one of the first advertisement and second advertisement to a participant computing device via a computer network, wherein the option including payment terms for each of the first advertisement and second advertisement. The computing device also receives an indication from the participant computing device of a selected advertisement via the computer network, and sends instructions to the participant computing device to display the selected advertisement on an image-enabled clothing article of the participant via the computer network.

14 Claims, 5 Drawing Sheets

(51) Int. Cl.
  *G06Q 50/00*  (2012.01)
  *G06Q 30/06*  (2012.01)

(56) References Cited

U.S. PATENT DOCUMENTS

| | | | | |
|---|---|---|---|---|
| 8,639,572 | B1* | 1/2014 | Barnes | G06Q 30/0241 |
| | | | | 705/14.4 |
| 8,712,797 | B1* | 4/2014 | Bezdek | G06Q 30/06 |
| | | | | 705/2 |
| 9,378,516 | B2* | 6/2016 | Aldrey | G06Q 30/0269 |
| 9,680,944 | B2* | 6/2017 | Wang | H04L 67/02 |
| 10,423,941 | B1* | 9/2019 | Turley | G06F 16/48 |
| 2002/0010589 | A1* | 1/2002 | Nashida | H04L 12/2805 |
| | | | | 704/275 |
| 2002/0029189 | A1* | 3/2002 | Titus | G06Q 20/10 |
| | | | | 705/39 |
| 2003/0114233 | A1* | 6/2003 | Hiei | G07C 9/27 |
| | | | | 472/92 |
| 2005/0080775 | A1* | 4/2005 | Colledge | G06Q 30/0251 |
| 2006/0259924 | A1* | 11/2006 | Boortz | H04N 5/44543 |
| | | | | 725/32 |
| 2007/0038508 | A1* | 2/2007 | Jain | G06Q 30/02 |
| | | | | 705/14.41 |
| 2010/0077017 | A1* | 3/2010 | Martinez | H04L 67/18 |
| | | | | 709/201 |
| 2010/0122286 | A1* | 5/2010 | Begeja | G06Q 30/02 |
| | | | | 725/34 |
| 2010/0185501 | A1* | 7/2010 | Chou | G01C 21/00 |
| | | | | 705/14.4 |
| 2010/0289665 | A1 | 11/2010 | Dickie et al. | |
| 2011/0166932 | A1* | 7/2011 | Smith | G06Q 30/02 |
| | | | | 705/14.53 |
| 2011/0270685 | A1* | 11/2011 | Marks | G06Q 30/02 |
| | | | | 705/14.66 |
| 2011/0282906 | A1* | 11/2011 | Wong | G06F 16/434 |
| | | | | 707/780 |
| 2012/0016735 | A1* | 1/2012 | Park | G06Q 30/02 |
| | | | | 705/14.42 |
| 2012/0062571 | A1* | 3/2012 | Malek | G06F 1/163 |
| | | | | 345/501 |
| 2012/0072286 | A1* | 3/2012 | Kilar | G06Q 30/02 |
| | | | | 705/14.55 |
| 2012/0116882 | A1* | 5/2012 | Sanghavi | G06Q 30/0257 |
| | | | | 705/14.55 |
| 2012/0254150 | A1* | 10/2012 | Gupta | G06Q 30/0256 |
| | | | | 707/709 |
| 2013/0027227 | A1* | 1/2013 | Nordstrom | G08G 1/202 |
| | | | | 340/990 |
| 2013/0059526 | A1 | 3/2013 | Moore et al. | |
| 2013/0080943 | A1* | 3/2013 | Reeves | G06F 3/0482 |
| | | | | 715/761 |
| 2013/0086607 | A1* | 4/2013 | Tom | G06Q 30/0241 |
| | | | | 725/32 |
| 2013/0263179 | A1* | 10/2013 | Dow | H04N 21/458 |
| | | | | 725/32 |
| 2014/0143035 | A1* | 5/2014 | Reardon | G06Q 20/10 |
| | | | | 705/14.11 |
| 2014/0244658 | A1* | 8/2014 | Mahmud | G06Q 50/01 |
| | | | | 707/748 |
| 2014/0344718 | A1* | 11/2014 | Rapaport | H04L 51/32 |
| | | | | 715/753 |
| 2015/0142575 | A1 | 5/2015 | Gerard et al. | |
| 2015/0324181 | A1 | 11/2015 | Segal | |
| 2015/0363816 | A1* | 12/2015 | Poglitsch | G06Q 30/0235 |
| | | | | 705/14.35 |
| 2016/0132903 | A1* | 5/2016 | Bansal | G06Q 30/0201 |
| | | | | 705/7.29 |
| 2016/0171503 | A1* | 6/2016 | Nelsen | G06Q 20/387 |
| | | | | 705/40 |
| 2016/0381158 | A1* | 12/2016 | Curtis | G06Q 30/0209 |
| | | | | 709/204 |
| 2017/0301160 | A1* | 10/2017 | Somani | G07B 15/00 |
| 2017/0316296 | A1* | 11/2017 | Ashiura | G06K 19/06075 |
| 2019/0012331 | A1* | 1/2019 | Zhang | G06F 16/29 |

FOREIGN PATENT DOCUMENTS

| | | |
|---|---|---|
| WO | 2012/141700 | 10/2012 |
| WO | 2014/131021 | 8/2014 |

OTHER PUBLICATIONS

Seneviratne; A Survey of Wareable Devices and Challanges; 2017; IEEE Communications; pp. 48; 2017.*

Zhou et al.; "Security/privacy of wearable fitness tracking IoT devices", Information Systems and Technologies (CISTI), 2014 9th Iberian Conference on. IEEE, 2014, 5 pages.

YouTube Video, "Security and Internet of Things: A World of Possibilities (Full Version dated Nov. 2015)", https://www.youtube.com/watch?v=AzS4v8xQUQI, IBM Academy of Technology Channel, Published on Nov. 17, 2015, 3 pages.

"LIBER8 Technology", http://www.liber8tech.com, Accessed Feb. 25, 2016, 1 page.

"I luminate", http://iluminate.com, Accessed Feb. 25, 2016, 5 pages.

* cited by examiner

SYSTEM AND METHOD FOR DYNAMIC ADVERTISING

STATEMENT REGARDING PRIOR DISCLOSURES BY THE INVENTOR OR A JOINT INVENTOR

The following grace period disclosure by the inventor is submitted under 35 U.S.C. § 102(b)(1)(A): YouTube Video, "Security and Internet of Things: A World of Possibilities (FULL VERSION dated November 2015)", https://www.youtube.com/watch?v=AzS4v8xQUQL IBM Academy of Technology Channel, Published on Nov. 17, 2015, 3 pages.

BACKGROUND

The present invention relates generally to advertising and, more particularly, to methods and systems for advertising utilizing image-enabled clothing articles.

In recent years, an increase in wearable devices has created opportunities in a number of business sectors. One area of interest has been the development of services and technologies related to so-called billboard clothing items, or image-enabled clothing. The increasing use of such items by consumers presents opportunities for sharing ideas through wearable clothing items. There are challenges associated with providing images to consumers in a manner that is beneficial to the consumer and third party entities. Therefore, there is a need for an effective approach for disseminating imagery, particularly in the context of crowd-sourced advertising.

SUMMARY

In an aspect of the invention, a computer-implemented method of displaying an image on an image-enabled clothing article includes: determining, by the computing device, that at least a first and a second advertisement are acceptable for a participant; sending, by the computing device, an option to select one of the first and second advertisements to a participant computing device via a computer network connection, the option including payment terms for each of the first and second advertisements; receiving, by the computing device, an indication from the participant computing device of a selected advertisement via the computer network connection; and sending, by the computing device, instructions to the participant computing device to display the selected advertisement on an image-enabled clothing article of the participant via the computer network connection.

In another aspect of the invention, there is a system for advertising with an image-enabled clothing article. The system includes a CPU, a computer readable memory and a computer readable storage medium associated with a computing device. Program instructions are stored on the computer readable storage medium for execution by the CPU via the computer readable memory. The program instructions include: program instructions to determine that first and second advertisements to display are acceptable; program instructions to send an option to select one of the first and second advertisements to a participant computing device of a participant via the computer network, wherein the option includes payment terms for each of the first and second advertisements; program instructions to receive an indication of a selected advertisement from the participant computing device via the computer network; and program instructions to send instructions to the participant computing device via the computer network to display the selected advertisement on an image-enabled clothing article of the participant.

In another aspect of the invention, there is a computer program product for displaying an image on an image-enabled clothing article. The computer program product comprises a computer readable storage medium having program instructions embodied therewith. The program instructions are executable by a computing device to cause the computing device to: determine an application user status associated with a social media application; and based on the determining, transmit data to the image-enabled clothing article to cause the image-enabled clothing article to display an image associated with the application user status.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
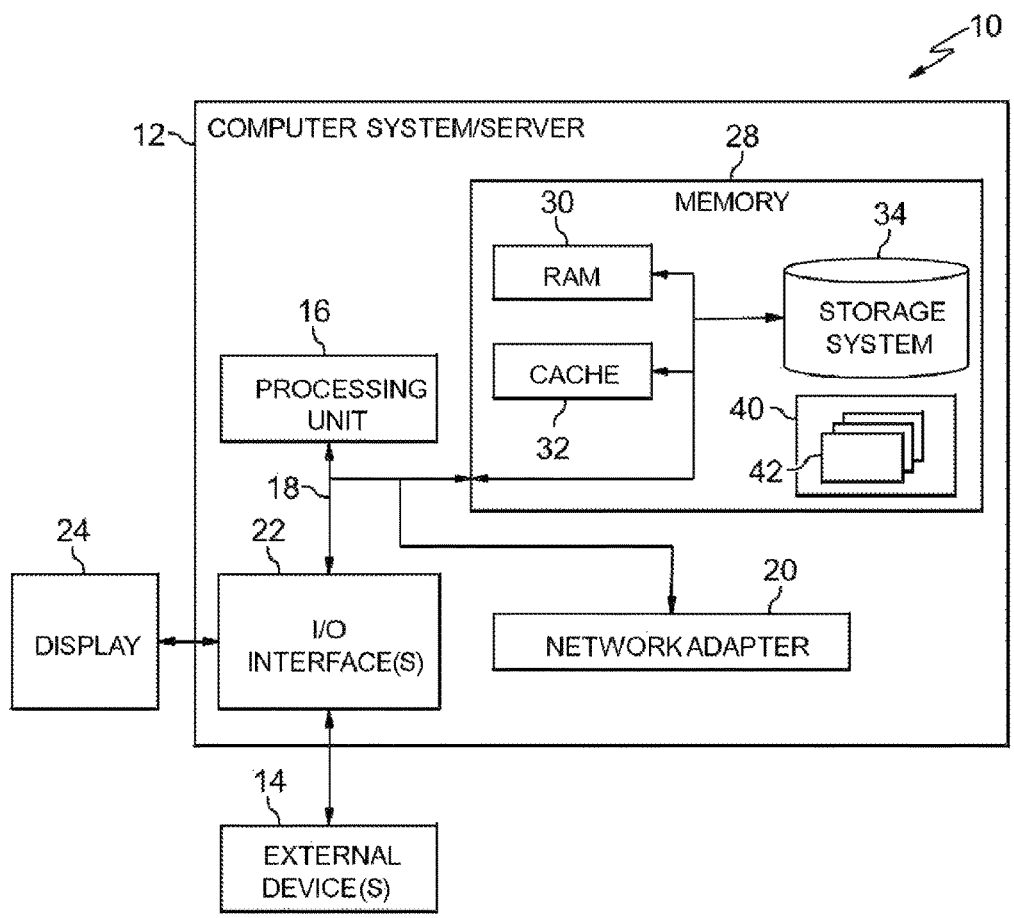
FIG. 1 depicts a computing infrastructure according to an embodiment of the present invention.

The present invention relates generally to advertising and, more particularly, to methods and systems for advertising utilizing image-enabled clothing articles. Implementations of the present invention can be used to display images utilizing an image-enabled clothing device. The term "image" or "images" as utilized herein should be understood to include one or more pictures, symbols, words, or any combination thereof, including moving images (e.g., scrolling text or video images). In embodiments, the use of the Internet of Things (IoT) wearables as a communications vehicle is enabled for multiple purposes. Various services could be used with this technology.

In embodiments, the present invention defines a methodology of registering at a central clearing house for advertising. In embodiments, edge computing may be utilized by participants to communicate with potential advertisers. In embodiments, the image distribution system of the present invention utilizes a block chain distributed database. In accordance with various embodiments, when a wearer of billboard clothing enters an area where a business wants to advertise, the wearer is matched with the type of advertisements allowed by the wearer. It is then determined if the display space and display density (e.g. pixel or LED density) of the billboard clothing are suitable for the advertisement, along with any other required specifications, such as color or black and white requirements. If multiple "fits" are found among various possible advertisements, then either an advertisement has priority based on content, or a "bid" situation is created wherein the wearer can select an advertisement to display. The selected advertisement (e.g., pixel image) is then sent to the wearer via their mobile device or other application that can control the display of the billboard clothing, and the advertisement is subsequently transmitted to and displayed by the billboard clothing. The advertisement will be displayed based on agreed upon parameters, such as time and distance.

Participants may include bank information with their participant information to enable wireless transfer of payment upon completion of an advertising session. The return for rental agreements (agreements to rent advertising space on an item of billboard clothing) may be cash, rewards programs or any other method of return value to the person wearing the billboard clothing item. Once the advertising parameters have been met, the wearer can negotiate for a new advertisement to display.

Optionally, a wearer will have the ability to display a mood or sentiment, such as when they are departing a movie or restaurant. In aspects, moods or sentiments expressed through a social media application may be simultaneously displayed through billboard clothing.

The present invention may also be utilized to display emergency broadcast messages. In aspects, missing person alerts or severe weather alerts may be broadcast via billboard clothing.

The present invention may also include a commercial fashion aspect, wherein designs or words may be downloaded for pure social fun and edification. Participants may pay a designer for an image, or the image may be provided for free, such as for promotional reasons.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or a Bluetooth low energy network (BLE network), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include implementations of advertising via one or more image-enabled clothing articles. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
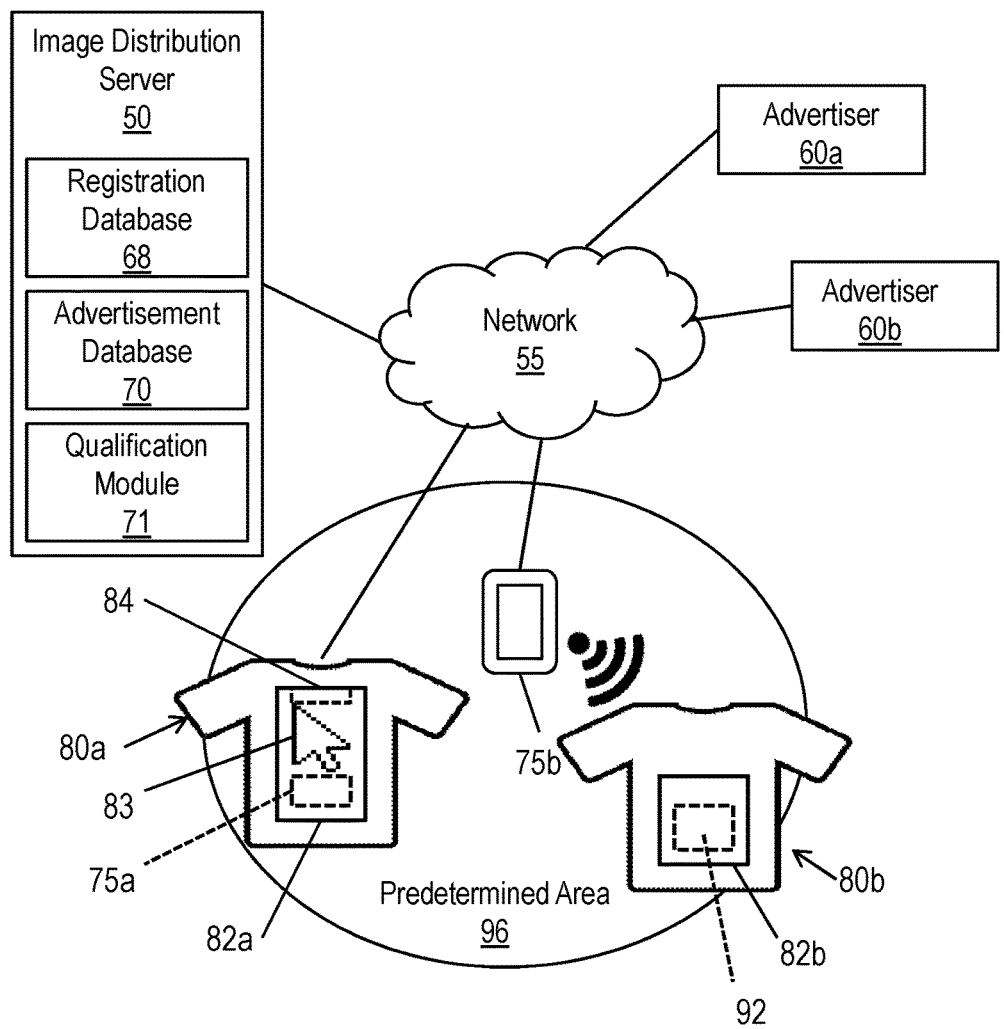
FIG. 2 shows an exemplary environment in accordance with aspects of the invention.

FIG. 2 shows an exemplary environment in accordance with aspects of the invention. The environment includes an image distribution server 50 (e.g., a web server) connected to a network 55. The image distribution server 50 may comprise a computer system 12 of FIG. 1, and may be connected to the network 55 via the network adapter 20 of FIG. 1. The image distribution server 50 may be configured as a special purpose computing device that is controlled by a third party image distributor, or may be a special purpose computing device that is controlled by a single image distributor or advertiser. For example, the image distribution server 50 may be configured to receive advertisements and accompanying data from one or more advertiser's computer devices 60a, 60b, to act as a third party distributor of the advertisements. The advertiser's computer devices 60a and 60b may be a general purpose computing device, such as a desktop computer, laptop computer, tablet computer, smartphone, etc., that is capable of providing advertisements and accompanying data to the image distribution server 50 via the network 55. The network 55 may be any suitable communication network or combination of networks, such as a local area network (LAN), a general wide area network (WAN), and/or a public network (e.g., the Internet).

Still referring to FIG. 2, image distribution server 50 includes a registration database 68, an advertisement database 70, and a qualification module 71. In embodiments, registration information or participant information communicated wirelessly by participant computing devices (e.g., 75a, 75b) to image distribution server 50 is stored in registrant database 68 and advertisement information communicated by advertiser's computing devices (e.g., 60a, 60b) are stored in advertisement database 70. In aspects of the invention, the qualification module 71 is utilized by image distribution server 50 to compare participant information and advertisement information to determine qualifying advertisements, as will be discussed in more detail below. It should be understood that registration database 68 and advertisement database 70 can be part of storage system 34 of computer system 12, and qualification module 71 can be one of program modules 42 of computer system 12.

The image distribution server 50 may be configured to communicate simultaneously with plural different participant computing devices 75a, 75b via computer network 55, and perform advertisement functions separately for each participant computer device 75a, 75b independent of the others. Participant computing devices 75a, 75b can be in the form of special purpose computing devices incorporated into an image-enabled clothing article, such as participant computer device 75a incorporated into a clothing article 80a including a display area (billboard) 82a, as depicted in FIG. 2. It should be understood that image-enabled clothing articles are capable of displaying pictorial and/or text based images 83 in a display area. In embodiments, participant computing device 75a includes a communication device indicated at 84, such as a touch screen or keyboard to enable a participant to communicate with image distribution server 50 through participant computing device 75a.

It should be understood that participant computing device 75a may include one or more components similar to those described with respect to computer system 12, wherein such components are specialized for an image-enabled clothing environment. For example, participant computing device 75a may include a memory 28 in the form of an image storage database for storing image data received from the image distribution server 50. Participant computing device 75a may also include program modules 42 that are specialty modules, such as an image processing module for formatting an image to be displayed on the display area 82a of the image-enabled clothing 80a and a location module for calculating and communicating a location of the special purpose computing device 75a to image distribution server 50.

Additionally, a participant computing device 75b may be in the form of a general purpose computing device configured to wirelessly communicate with a special purpose controller or processor 92 of an image-enabled clothing article 80b including an image display area 82b. Participant computing device 75b is depicted herein as a smartphone, but could be in the form of a desktop computer, laptop computer, tablet computer, etc.

The manufacture of billboard clothing for use with the present invention may be accomplished by attaching a panel of light emitting diode (LED) lights with microprocessors in a linear grid pattern, and wiring the lines together to be controlled by a single processor such as a tweensy, which can in turn communicate with a controller (to control the pixel display) through low energy Bluetooth. The panel may then be attached to an under layer of material, which has an overlay of several layers of opaque fabric to hide the LEDs. The opaque fabric preferably has enough density to hide the lights but still allow the LEDs to be seen when illuminated. The LEDs may be mounted individually or on a strip. In the "lighted" mode, patterns can be created depending on the density of the LEDs, both horizontally and vertically. Items of clothing that could be utilized as billboards for advertising include skirts, shirts, vests, hats, shoes and jackets, for example. The present invention is not intended to be limited to a particular image-enabled clothing article or design. Instead, the present invention is intended for use with any clothing article (e.g., 80a, 80b) having an image display area (e.g., 82a, 82b).

In embodiments, the participant computing device (e.g., 75a, 75b) is global positioning system (GPS) enabled, and is configured to send a signal to the image distribution server 50 indicating the location of the participant computing device. Other methods of localization could also be utilized by the image distribution sever 50 and/or participant computing devices 75a, 75b, to share location information of advertising participants. In embodiments, location information of the participant computing device 75a, 75b, conveyed to image distribution server 50 is utilized to determine that the participant computing device 75a, 75b is within a predetermined geographic area (predetermined advertising area 96).

It should be understood that an image distributor will communicate with participants of an advertising program via the image distribution server 50 through a computer network connection (e.g., 55), such that reference to a distributor in method steps discussed hereafter should be understood to be performed through image distribution server 50. Likewise, participants will communicate with the image distribution server 50 via the participant computing devices (e.g., 75a, 75b), such that reference to participants in the method steps discussed hereafter should be understood to be performed through participant computing devices.

In embodiments, participants (e.g., users of participant computing devices 75a, 75b) in an advertising program administered by an image distributor (e.g., user of image distribution server 50) will register with the distributor, such as through a website. Upon registering, a participant may enter participant information including demographic information, types of advertising they will partake in, the size of different articles of image-enabled clothing (billboard clothing), display capabilities (e.g., size of display, LED density, pixel size, available colors, black and white renderings allowed, etc.). In embodiments, participant information may be stored on a participant computing device (e.g., 75b), and may be selectively shared with image distribution server 50 with or without prior registration of the information with the distribution server 50.

Participant information, including participant parameters, shared with the distributor may also include the type of image-enabled clothing (e.g., clothing articles 80a, 80b) owned by the participant (e.g., a shirt, skirt, etc.), user preferences regarding types of advertisements (e.g., cultural and social preferences, such as no adult-content advertisements), geographic or time limitations (e.g., no advertising after 6:00 pm, no advertising within a particular geographic zone), and payment parameters (e.g., bank information, minimum rental fee required for participant to display advertisement etc.). By enabling user preferences, the present method assures that a participant may avoid the display of personally undesirable images and phrases. Participants may also share social media information, such as the number of social media contacts, which can be utilized by a distributor to determine the best participant for displaying a particular advertisement. In addition, the participant will state if they are willing to advertise short term items based on a beacon signal. The distributor (e.g., 50) then stores the participant information in a registration database (e.g., 68).

The distributor will also store advertisement information (advertisement parameters) in an advertisement database (e.g., 70). Advertisement parameters associated with each advertisement available for display may include geographic preferences (e.g., only display within 100 feet of a company), time preferences (e.g., do not display before 6:00 pm), and display requirements (e.g., minimum size, color and density requirements for ad). Other parameters may include rules set by an advertiser based on information provided by a participant, such as a rule to preferentially display an advertisement on the clothing of a participant having the highest number of social media connections.

Figure 3:
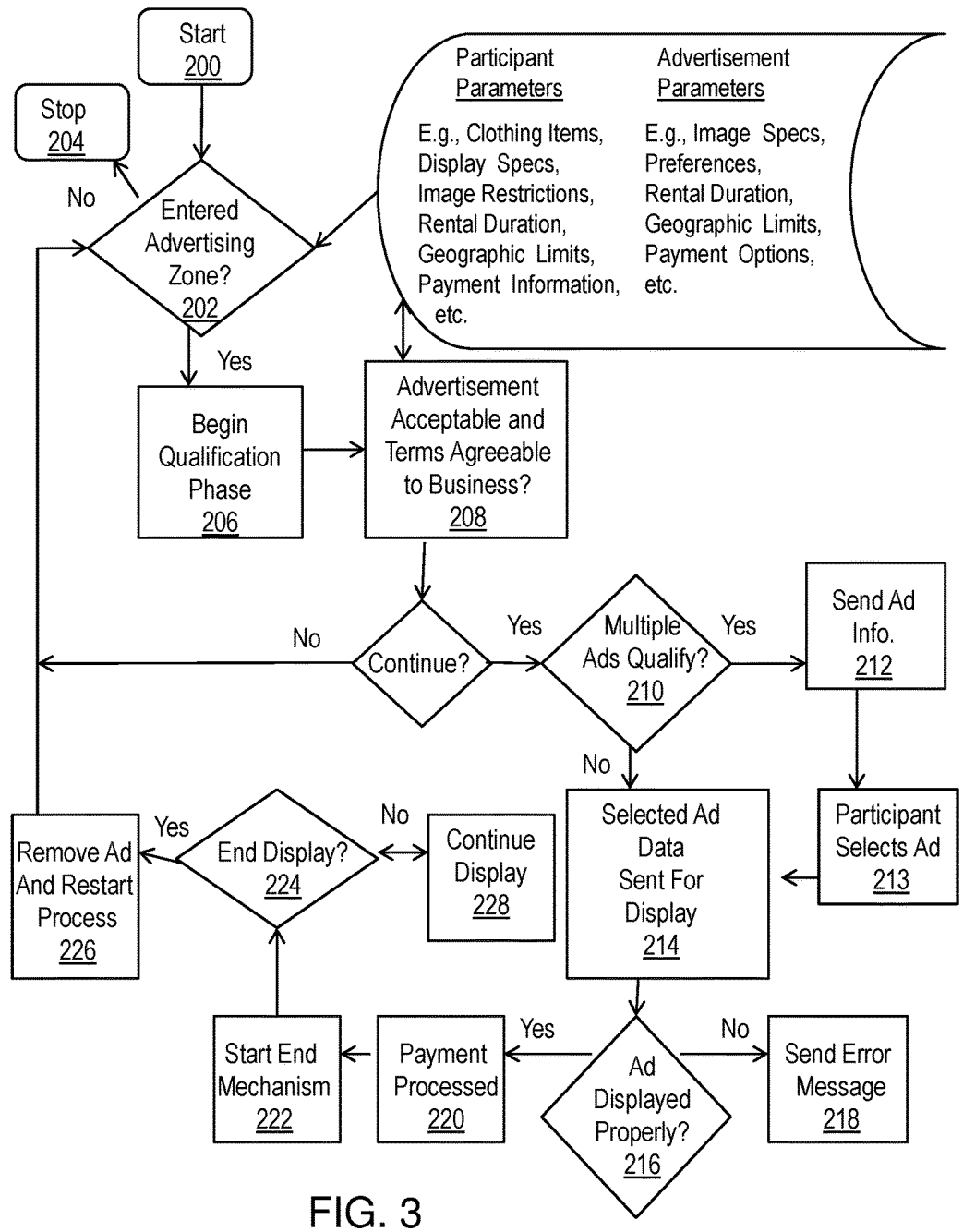
FIG. 3 shows a flowchart of steps of a method in accordance with aspects of the invention.

FIG. 3 shows a flowchart of an advertisement method in accordance with aspects of the invention. Steps of the method of FIG. 3 may be performed in the environment illustrated in FIG. 2, and are described with reference to elements shown in FIG. 2. At step 200 a distributor initiates an advertisement program cycle. At step 202, the distributor determines whether any registered participants (e.g., users of participant computing devices 75a, 75b) have entered an advertising zone (e.g., 96). The advertising zone 96 can be a specific geographic location, such as within a geofenced location, or a general location, such as anywhere outside of a geofenced location. Optionally, parameters can be set such that advertising zone 96 is any location. For example, parameters can be set so that participants are willing to advertise at any location when their image-enabled clothing article (e.g., 80a, 80b) is on or enabled. The advertising zone 96 can be based on specified advertising parameters, participant parameters, or both advertising and participant parameters. By way of example, advertisers 60a and 60b may both register advertisements with the distributor that define an advertising zone 96 as the geographic region of a sports stadium. Participants may register personal preferences that include any geographic area outside of their respective homes. The distributor may determine that the geographic preferences of the advertisers 60a and 60b and the participants overlap within the advertising zone 96 of the sports stadium. The distributor may determine the location of the participants using GPS or other location methods.

It should be understood that multiple advertising zones can be defined for a plurality of different advertisements available to display. Additionally, it should be understood that any number of participants could be identified as entering an advertising zone. For the sake of brevity, only one advertising zone 96 and one participant will be discussed with respect to the method detailed in FIG. 3, however, it should be understood that the method steps detailed in FIG. 3 could be simultaneously implemented for multiple participants and multiple advertising zones.

If no participant has entered an advertising zone 96, then no further action is taken at step 204. If the distributor determines that a participant is within the advertising zone 96, a qualification phase begins at step 206. During the qualification phase, the distributor compares participant parameters from the registration database 68 with advertising parameters from the advertisement database 70 utilizing qualification module 71 to determine if there are any advertisements available for display that are a match for the participant. The term "match" in this context means that parameters set by the participant and parameters associated with the advertisement are mutually acceptable to both the participant and the advertiser associated with the advertisement. For example, an advertisement for display may have associated parameters regarding display requirements, such as the size of a display, color requirements, and/or pixel or light density requirements. Therefore, the advertisement would only be matched with a participant when their participant parameters indicate that their image-enabled clothing has display capabilities that match with the display requirement parameters of the advertisement. By way of another example, the participant may have registered participant parameters refusing any advertisements with an adult theme. In this case, an advertisement for an adult beverage would not be a qualifying advertisement for the participant.

At step 208, if no advertisements are matched with the participant then the process starts over at step 202. In aspects, a message may be sent to the participant, a third party and/or the distributor when no qualifying advertisements are found at step 208. At step 208, if one or more advertisements are matched with the participant (advertisement parameters match with participant parameters), then the distributor moves on to step 210. At step 210, the distributor determines if multiple advertisements match with the participant. At step 212, if multiple advertisements are an acceptable match for the participant, then information regarding the acceptable advertisements is sent to the participant's computing device (e.g., 75a, 75b). At step 213 the participant selects one of the acceptable advertisements for display, e.g., as described with respect to FIG. 4. In embodiments, participant parameters may include parameters for automatic acceptance of one advertisement over another based on terms and conditions. For example, the participant may choose for the system to automatically accept the best offer (e.g., highest bidder or highest revenue). The parameters for automatic acceptance may be associated with a participant's short term goal. For example, a participant may have a short term goal of obtaining a 20% off coupon from an advertiser, and may set parameters to automatically accept advertisements based on that goal. Once the participant selects an advertisement for display at step 213, or the system determines that one of the advertisements should be automatically accepted based on participant parameters, advertisement data associated with the selected advertisement will be sent to the participant' computing device (e.g., 75a, 75b) by the distributor, enabling display of an advertising image by the participant's image-enabled clothing (e.g., 80a) at step 214. In embodiments, the advertisement image may not be displayed until the participant has accepted a particular rental agreement, including for example, an agreement regarding advertisement duration, location and payment parameters.

If only one advertisement (e.g., 83) is qualified at step 208, the advertisement image is sent to the participant for display at step 214. In embodiments, a security feature is included such that the participant must accept the advertisement image and/or rental terms associated with displaying the advertisement image 83 before the advertisement image can be displayed by their image-enabled clothing article (e.g., 80a, 80b). Alternatively, security parameters may be included in participant parameters, such that only advertisement images meeting the security parameters at step 208 will qualify. In this situation, a single qualifying advertisement image meeting the security parameters may be automatically displayed on a participant's clothing article without the participant having to manually accept the advertisement image.

In embodiments, controller/processor 92 or a controller/processor of participant computer device 75a, processes the advertisement image received from the image distribution server 50 to format the image for display, based on parameters of the display 82b of the associated image-enabled clothing article 80b, to ensure that the advertisement image is displayed in an optimal manner.

After a selected ad (e.g., 83) is sent for display at step 214, the distributor determines whether the advertisement image was displayed properly at step 216. For example, participant computing device 75a may be configured to send an error message to a participant and to image distribution server 50 if a received image 83 cannot be properly displayed on image-enabled clothing 80a. At step 218 an error message is sent to the participant if it is determined at step 216 that the advertisement image was not displayed properly. The error message may be sent to a participating computing device 75a, 75b by an associated image-enabled clothing article 80a, 80b, or by the distributor. For example, image-enabled clothing 80a may send a message to the distributor notifying the distributor that the image did not display properly, and the distributor may in turn send an error message to the participant (via email, text message or other format) notifying them that they will not be receiving credit for advertising the image due to a display error. In embodiments, the distributor may remove a particular image-enabled article of clothing from its list of usable display options if more than one error message is received, or it is otherwise determined that the image-enabled article is an undesirable advertising option. In embodiments, a confirmation message can be sent to a third party indicating that the image did or did not display properly. For example, in the case of a participant who is an athlete, a confirmation message may be sent to a sponsor from the participant's image-enabled clothing article 80a confirming that the sponsor's advertising image was displayed by the image-enable clothing article 80a. In embodiments, the distributor will continue trying to send image data to a participant after an error message is sent at 218. At step 220, an advertisement rental payment is processed and sent to the participant if it is determined at step 216 that the advertisement image was displayed properly. The return (rental payment) for the rental agreements may be cash, rewards programs, or any other method of returning value to the participant. In one example, participant registration data includes bank information, which can be utilized by a distributor to automatically wire funds to a participant.

At step 222, an end mechanism is started to determine if a termination point has been reached. In aspects of the invention, the end mechanism utilizes advertising and/or participant parameters to determine if the termination point has been reached. A termination or end point may be based on a geographic location of the participant (or associated participant computing device 75a, 75b), a time period for displaying the advertisement image, or other parameters. By way of example, a distributor may determine that a termination point for the display of an advertisement image 83 has been reached when the distributor determines that the participant has left an advertising zone 96. At step 224, if a termination or end point has been reached, display of the advertisement image (e.g., 83) will be terminated, and the advertisement process will restart at step 226. If no termination or end point has been reached at step 224, then the advertisement image will continued to be displayed, as represented by step 228, until the distributor determines that a termination point has been reached, or the participant terminates display of the advertisement image. In embodiments, a participant can manually terminate the display of an advertisement image at any time. Such a termination may trigger a termination message to be sent to the distributor by the participant's image-enable clothing item (e.g., 80a, 80b) or by an associated participant computing device 75b.

It should be understood that images displayed (or not displayed) by a participant may change with the participant's location. For example, if a participant enters a location in which it is undesirable to advertise an image (e.g., school zone), the system may determine that the participant has entered the location (e.g., gps information from the participant computing device 75b is sent to image distribution sever 50), and based on system parameters (e.g., participant parameters, advertisement parameters, or a combination thereof), instructions are sent from image distribution server 50 to the participant's image-enabled clothing article to end display of the advertising image. In embodiments, system parameters may be set based on an agreement between a distributor or third party and a participant such that images are displayed on the participant's image-enabled clothing article based on the participant's location. For example, a celebrity may display a first image in a library that is different from a second image displayed later at a sports event.

Figure 4:
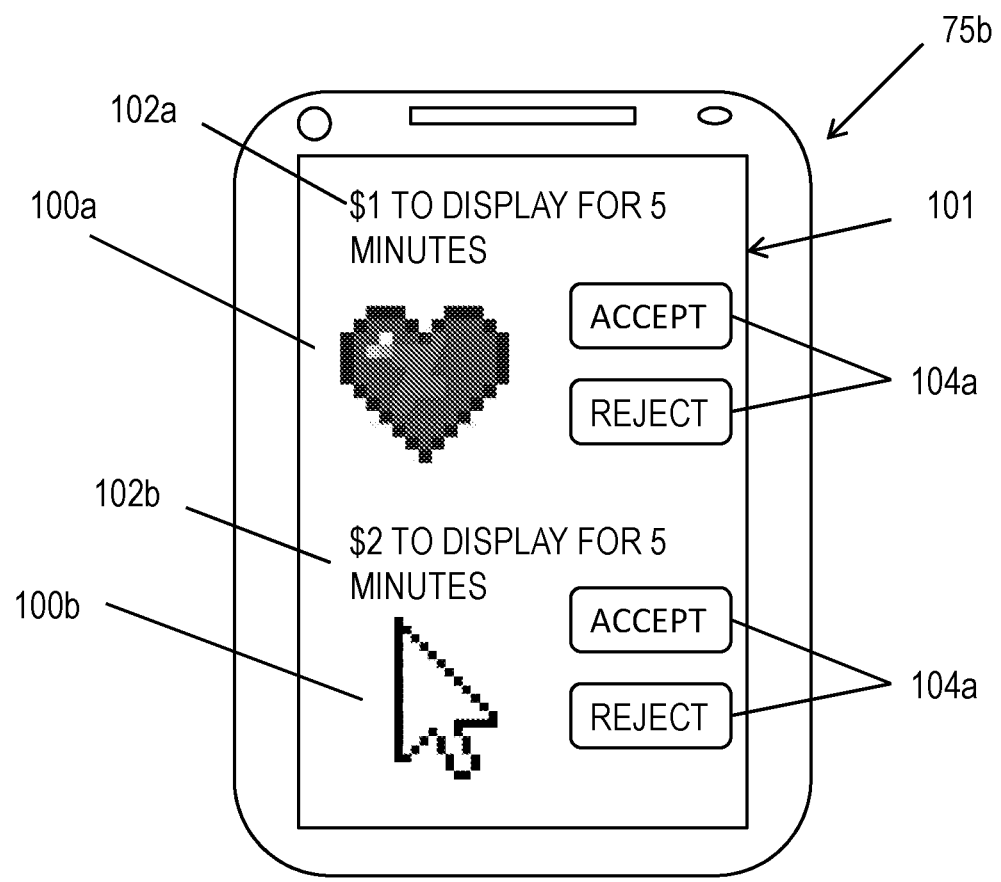
FIG. 4 shows a participant computing device display in accordance with aspects of the invention.

FIG. 4 depicts an embodiment of the participant computing device 75b during step 212 of FIG. 3. More specifically, when the distributor determines that there are more than one qualifying advertisements for a participant, the advertising information associated with advertising options may be displayed to the participant via participant computing device 75a for selection. In the example depicted in FIG. 4, first and second advertising options 100a and 100b are sent by the distributor to the participant computing device 75b for display on a display screen 101. In the embodiment shown, display screen 101 is in the form of a touchscreen, such that display screen 101 also constitutes a user communication device. Each of the advertising options 100a, 100b includes an accompanying rental or payment offer 102a, 102b. Payment offer 102a, 102b may be any monetary amount, including zero, or may be in the form of other compensation types (e.g., coupons, charitable or altruistic return). For example, a first advertisement may offer monetary compensation while a second advertisement may offer no monetary compensation but indicate that the advertisement is for a charitable organization. In embodiments, the distributor is a third party advertisement distributor, and each of the advertising options 100a, 100b has been provided to the distributor by distinct sources, such as advertisers 60a, 60b. In such situations, the payment offers 102a, 102b are part of a bidding system that enables the advertisers 60a, 60b to offer competing advertisements with different payment options. For example, if predetermined rental area 96 is a sports arena, the advertisers 60a, 60b can compete for advertising space on participants' image-enabled clothing articles (e.g., 80a, 80b) by raising or the lowering payment offers 102a, 102b to the participants.

In embodiments, advertisement parameters provided to the distributor by the advertisers 60a, 60b include various pricing parameters, such as a higher payment offer for peak hours, and a lower payment offer for off hours. In embodiments, pricing parameters may vary depending on how many viewers are present in the vicinity of the participant. By way of example, a social media score assigned to a participant may indicate that they are more likely to have "friends" around them to view the advertisement, and they may be provided with a higher payment offer accordingly. By way of another example, a celebrity may be offered a higher bid price if the system determines that they are in a location likely to expose them to fans and/or the press (e.g., inside a stadium). In embodiments, a probability algorithm could be utilized to determine the likelihood of a participant being in a populated location (i.e., a location with a higher number of viewers). Optionally, the advertisers 60a, 60b can communicate pricing parameters to the distributor on an ongoing basis, enabling the advertisers 60a, 60b more flexibility to competitively bid for advertising space on a participant's image-enabled clothing article. With this system, the participant can select the most desirable advertisement 100a or 100b by selecting a user interface option 104a, 104b, depending on personal preference and the payment offers 102a, 102b. In embodiments, the user interface options 104a, 104b are in the form of "accept" and "reject" touch screen buttons of user communication device 101, as depicted in FIG. 4.

Payment options in accordance with the present invention include commercial rental, where rates of payment can be influenced by multiple factors, including parameters of the clothing item (e.g., size of display), the length of time displaying the advertisement, demographics/physical stature of the wearer, social media information of participant (e.g., number of social media followers), and auction/bid/volumes (e.g., number of participants available and number of advertisements available). In embodiments, the distributor may utilize participant parameters and advertisement parameters to calculate the payment offer 102a, 102b. In one example, if a first participant has an image-enabled clothing article 80a with a larger display 82a than the display 82b of a second participant, the advertisers 60a, 60b may consider the first participant to be a more desirable advertisement option, and may include in their advertisement parameters a rule to offer the first participant a higher rental offer than the second participant.

In embodiments, a shorter term rental of space may be negotiated based on receiving a beacon signal (e.g., GPS signal). For example, the distributor may receive location information (e.g., GPS location information) from participant computing device 75b, indicating that the participant is within the predetermined advertising area 96, and may thereafter send qualifying advertisement offers to the participant computing device 75b. The time period for display may be very short, such as when a participant is walking by a storefront. The rental agreement could provide a level of security by profiling signals that a wearer will accept.

Figure 5:
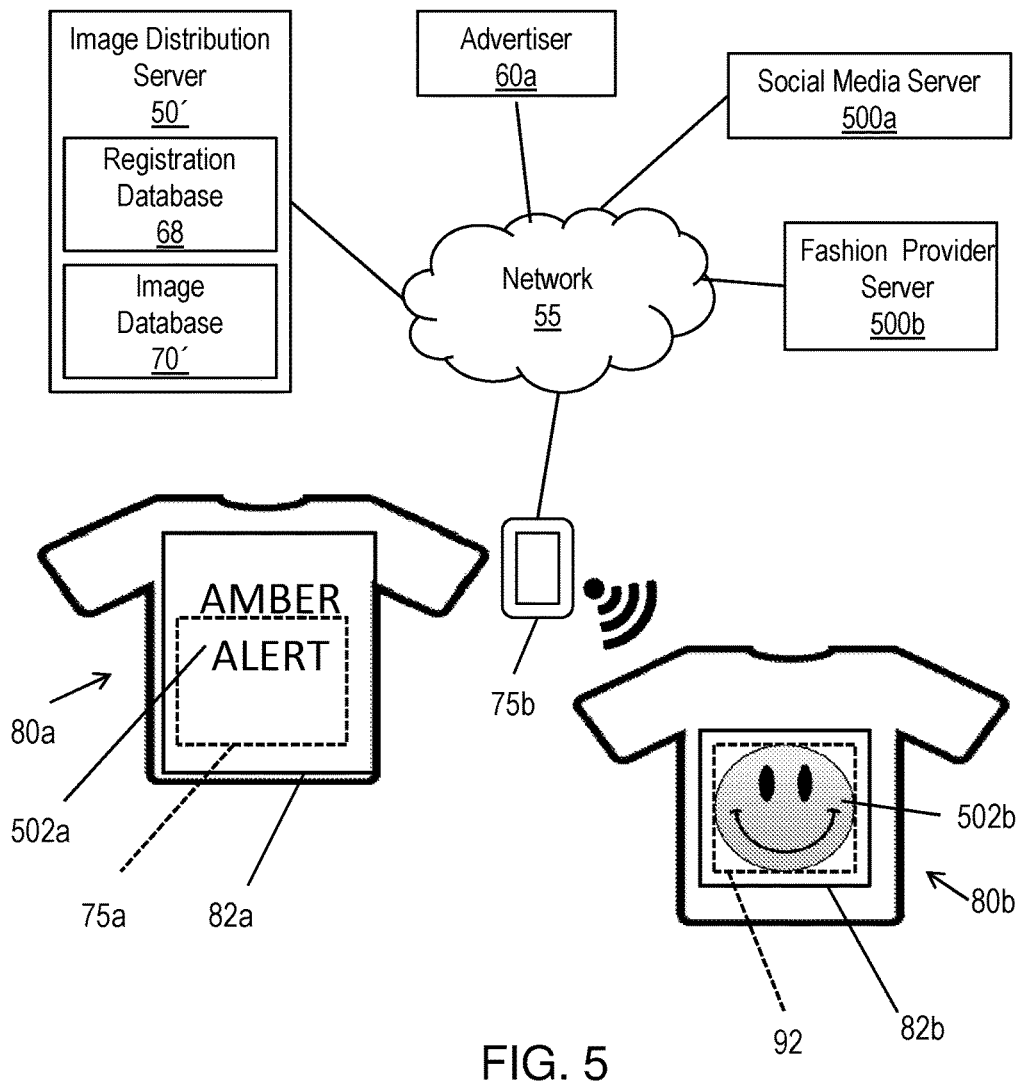
FIG. 5 shows an exemplary environment in accordance with another embodiment of the invention.

FIG. 5 depicts an embodiment wherein an image distribution server 50' may distribute images for purposes other than paid advertisement. The image distribution server 50' may obtain participant information, including participant parameters, from participant computing devices (e.g., 75a, 75b). An associated image database 70' may include images and associated image parameters from a number of sources. In one example, the image distribution server 50' receives images and associated parameters from an advertiser 60a, a social media server 500a, and a fashion provider sever 500b. Participants in the image distribution program may register their information with image distribution server 50', which is then saved in the associated registration database 68. Alternatively, the participants in the image distribution program may register directly with the advertiser 60a, the social media server 500a and/or the fashion provider sever 500b. In embodiments, participants may display their own images (i.e., images originating with the participant, such as original artworks, phrases, etc.) on an image-enabled clothing article (e.g., 80a, 80b). In embodiments, participants may register their own images with image distribution server 50', for personal use or for sharing with other participants through image database 70'. In embodiments, participants may be paid for images contributed to image distribution server 50'.

In embodiments, participants (user of participant computing devices 75a, 75b) may register parameters with the image distribution server 50' that allow public service announcements or emergency broadcast messages to be displayed on their image-enabled clothing 80a, 80b. Such public service announcement may include any type of image in accordance with the present invention. In this way, image-enabled clothing 80a, 80b may be used to help in emergency situations. In one example, if a person becomes missing, one broadcast may be set to identify the person based on their clothing. In another scenario, crowd sourcing could be used to display the person's picture and/or demographic information via image-enabled clothing 80a, 80b to allow others to help find the person. In another example, a participant 80a may set their parameters to enable the image distribution server 50' to automatically send an Amber Alert 502a to their image-enabled clothing 80a. In aspects, a public service announcement sent to a participant may automatically interrupt any advertisement image currently displayed on their image-enabled clothing (e.g., 80a, 80b), or may preempt the display of an advertisement image during a time period for displaying the public service announcement. In aspects, participant parameters associated with acceptance of an image may be bypassed or disregarded in the situations where a public service announcement is sent to the participant to enable display of the public service announcement on the participant's image-enabled clothing article.

The present invention allow for the interfacing of image-enabled clothing to display mood sentiment, based on leaving an event, for example. In embodiments, the interface can be based on input from social media sites or from an app or smart device. The clothing profile or parameters may be set up to read a "mood" or "status" (e.g., social media status), display the source associated with the "mood" or "status" (e.g., which movie, restaurant, etc.), and the length of time or distance from the source that a participant wishes to display the mood/feedback. In embodiments, an image distribution server (e.g., 50) or a processor (e.g., 92 or processor in participant computing device 75b) of an image-enabled clothing article (e.g., 80b) is configured to determine an application user status (e.g., a "happy" status posted on a social media application), and is also configure to transmit data to the image-enabled clothing article to instruct the image-enabled clothing article associated with the user to display an image associated with the application user status. In embodiments, the transmitting will be performed by a computing device running the social media application (e.g., participant computing device 75b). In embodiments, the image-enabled clothing article (e.g., 80b) displays the image associated with the application user status for a predetermined period of time or while the image-enabled clothing article is within a predetermined distance from a location associated with the social media application status. For example, a smiley face image 502b may be displayed on an image-enabled clothing article 80b while the user is within 100 feet of a restaurant that the user has "liked" using a social media application. In one example, a participant may set parameters to enable communication between a social media application on a mobile participant computing device 75b and the controller/processor 92 of the image-enabled clothing 80b, such that a social media status of the participant is simultaneously displayed on the social media application and on the display 82b. In aspects of the invention, a social media status of the participant may be utilized to display qualifying images associated with the status. For example, a user status of "happy" may translate to displaying a qualifying image of a large smiley face emoji image 502b on image-enabled clothing 80b.

In embodiments, participants may pay for the use of images. In one example, a participant may pay the fashion provider 500b directly, or through an image distributor (user of image-distribution server 50'), for rental of a fashion image (e.g., 502b) to be displayed on the clothing article 80b. A website may be provided by the distributor or directly by the fashion provider 500b to enable participants to browse images available for rent. In this way, consumers may utilize images that are considered fashionable. For example, a participant may desire a particular color, a particular team at a sporting event, or other design patterns of interest. Optionally, fashion provider 500b may provide free images, such as for promotional reasons.

As previously noted, in embodiments, a third party service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that desires to advertise products and/or services. In return, the service provider can receive payment from the customer(s) under a subscription and/or fee agreement and/or the service provider can receive payment from the sale of advertising content to one or more third parties. In embodiments, the distributor/clearinghouse (e.g., 50, 50') only receives input from secure and approved sources.

In still another embodiment, the invention provides a computer-implemented method for displaying advertisement images on an image-enabled clothing article. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of displaying an image on an image-enabled clothing article including a display area, comprising:

monitoring, by a computing device, location data of a remote participant computing device received via a computer network;

determining, by the computing device, that the location data matches a location requirement of a first image and a second image based on a comparison of the location data with stored image parameters;

determining, by the computing device, that a remote wearable image-enabled clothing article of the participant has display capabilities that match with display requirements of the first image and the second image based on a comparison of the stored image parameters and stored participant parameters;

selecting, by the computing device, payment terms for the first image from a plurality of predetermined payment terms for the first image based on image parameters of the first image from the stored image parameters and the stored participant parameters;

selecting, by the computing device, payment terms for the second image from a plurality of predetermined payment terms for the second image based on image parameters of the second image from the stored image parameters and the stored participant parameters;

sending, by the computing device, an option to select one of the first image and the second image to the remote participant computing device via the computer network based on the determining that the location data matches the location requirement and the determining that the wearable image-enabled clothing article of the participant has display capabilities that match with the display requirements of the first image and the second image, the option including the payment terms for each of the first image and the second image;

receiving, by the computing device, an indication from the participant computing device of a selected image selected from the first image or the second image via the computer network;

initiating, by the computing device, a display of the selected image on the wearable image-enabled clothing article of the participant via the computer network;

receiving, by the computing device, participant information of the participant, including the participant parameters;

determining, by the computing device and based on the location information, that the participant has entered a predetermined advertising zone;

accessing, by the computing device, a database of images to display, wherein each of the images is associated with a respective one of the stored image parameters;

comparing, by the computing device, the plurality of participant parameters with the plurality of image parameters; and determining that at least the first image and the second image are acceptable for the user at the predetermined advertising zone based on the comparing, wherein:

the monitoring the location data of the remote participant computing device includes receiving a signal from the remote participant computing device via the computer network indicating that the participant computing device is within the predetermined advertising zone; and determining that the participant has entered the predetermined advertising zone comprises determining that the remote participant computing device has entered a predetermined geographic area utilizing global positioning system (GPS) technology.

2. The computer-implemented method of claim 1, wherein the source of the first image is different from the source of the second image, and the first image and the second image are pixel images.

3. The computer-implemented method of claim 1, further comprising:

receiving, by the computing device, a signal from the remote wearable image-enabled clothing article indicating that the selected image is displayed on a display of the remote wearable image-enabled clothing article; and processing, by the computing device, payment to the participant.

4. The computer-implemented method of claim 1, further comprising:

receiving, by the computing device, a signal from the remote participant computing device indicating that the selected image did not display correctly on a display of the remote wearable image-enabled clothing article.

5. The computer-implemented method of claim 1, wherein the participant is a first participant, and the method further comprises:

determining, by the computing device, that at least one of the first image and a second image are acceptable for a second participant;

ranking, by the computing device, the first participant and the second participant based on social media information of the first participant and the second participant;

wherein the selecting the payment terms for the first image and the selecting the payment terms for the second image are based on the ranking; and sending, by the computing device, the payment terms to a participant computing device of the second participant via a computer network.

6. The computer-implemented method of claim 1, further comprising:

sending, by the computing device, instructions to the remote participant computing device via the computer network to automatically display a public service announcement on the remote wearable image-enabled clothing article.

7. A system for advertising with an image-enabled clothing article, comprising:

a CPU, a computer readable memory and a computer readable storage medium associated with a computing device;

program instructions to monitor location data of a remote participant computing device received via a computer network;

program instructions to determine that the location data matches location requirements of a first image and a second image based on a comparison of the location data with stored image parameter;

program instructions to determine that a remote wearable image-enabled clothing article of the participant has display capabilities that match with display requirements of the first image and the second image based on a comparison of the stored image parameters and stored participant parameters;

program instructions to select a payment offer for the first image from a plurality of predetermined payment offers based on peak hours and non-peak hours;

program instructions to select a payment offer for the second image from a plurality of predetermined payment offers based on peak hours and non-peak hours;

program instructions to send an option to select one of the first image and the second image to the remote participant computing device of the participant via the computer network, wherein the option includes the payment offer for each of the first image and the second image;

program instructions to receive an indication of a selected image from the remote participant computing device via the computer network;

program instructions to send instructions to the remote participant computing device via the computer network to display the selected image on the remote image-enabled clothing article of the participant;

program instructions to receive participant information of participants via the computer network, including the participant parameters, and save said information in a registration database;

program instructions to determine that the participant has entered a predetermined advertising zone based on the monitoring the location data of the remote participant computing device; and program instructions to determine that the first image and the second image to display are acceptable based on advertising parameters of the first and second images and the participant parameters of the participant, wherein the program instructions to monitor the location data of the remote participant computing devices includes program instructions to receive a signal from the remote participant computing device via the computer network indicating that the participant computing device is within the predetermined advertising zone;

wherein the program instructions to determine that the participant has entered the predetermined advertising zone utilizes global positioning system (GPS) technology, and wherein the program instructions are stored on the computer readable storage medium for execution by the CPU via the computer readable memory.

8. The system of claim 7, wherein a source of the first image is different from a source of the second image.

9. The system of claim 7, wherein:

the advertising parameters include display requirements for each of the first and second images; and the participant parameters include specifications regarding capabilities of a display of the remote wearable image-enabled clothing article.

10. The system of claim 7, further comprising:

program instructions to receive a signal from the participant computing device indicating that the selected image did not display correctly on the remote wearable image-enabled clothing article; and program instructions to send an error message to the participant computing notifying them the participant that the selected image did not display correctly.

11. The system of claim 7, wherein the selecting the payment offer for the first image and the second image is further based on at least one of the group consisting of: a probability of the participant being in a populated location; and a number of participants available to display images and a number of images available.

12. The system of claim 7, further comprising:
program instructions to send instructions to the remote participant computing device via the computer network to automatically display a public service announcement.

13. The method of claim 1, further comprising:
monitoring, by the computing device, location data of a second remote participant computing device received via the computer network;
determining, by the computing device, that the location data of the second remote participant computing device matches the location requirement of the first image and the second image based on a comparison of the location data with stored image parameters;
determining, by the computing device, that a second remote wearable image-enabled clothing article of a second participant has display capabilities that match with display requirements of the first image and the second image based on a comparison of the stored image parameters and the stored participant parameters;
automatically selecting, by the computing device, the first image for display on the second remote image-enabled clothing article based on the participant parameters; and
initiating, by the computing device, a display of the first image on the second remote wearable image-enabled clothing article of the participant via the computer network in response to the automatically selecting the first image.

14. The system of claim 7, wherein the monitoring location data comprises monitoring global positioning system (GPS) signal data received from the remote participant computing device.

* * * * *